(12) United States Patent
Saito et al.

(10) Patent No.: US 9,688,839 B2
(45) Date of Patent: Jun. 27, 2017

(54) ANTI-STATIC AGENT FOR ABS RESIN COMPOSITION, AND ABS RESIN COMPOSITION

(71) Applicant: NIPPON NYUKAZAI CO., LTD., Tokyo (JP)

(72) Inventors: Yuta Saito, Kawasaki (JP); Taku Nakamura, Kawasaki (JP); Wataru Kagayama, Kawasaki (JP)

(73) Assignee: NIPPON NYUKAZAI CO., LTD., Tokyo (JP)

( * ) Notice: Subject to any disclaimer, the term of this patent is extended or adjusted under 35 U.S.C. 154(b) by 0 days.

(21) Appl. No.: 14/905,625

(22) PCT Filed: Mar. 24, 2014

(86) PCT No.: PCT/JP2014/058125
§ 371 (c)(1),
(2) Date: May 23, 2016

(87) PCT Pub. No.: WO2015/008507
PCT Pub. Date: Jan. 22, 2015

(65) Prior Publication Data
US 2016/0304702 A1 Oct. 20, 2016

(30) Foreign Application Priority Data

Jul. 19, 2013  (JP) .................................. 2013-150853
Aug. 23, 2013  (JP) .................................. 2013-173951

(51) Int. Cl.
| | | |
|---|---|---|
| C08K 5/19 | (2006.01) | |
| C08K 5/42 | (2006.01) | |
| C09K 3/16 | (2006.01) | |
| C08L 55/02 | (2006.01) | |
| C08K 5/41 | (2006.01) | |
| C08K 5/17 | (2006.01) | |
| C08G 65/26 | (2006.01) | |
| C08G 65/326 | (2006.01) | |
| C08G 65/334 | (2006.01) | |

(52) U.S. Cl.
CPC ............ *C08K 5/42* (2013.01); *C08G 65/2606* (2013.01); *C08G 65/326* (2013.01); *C08G 65/3344* (2013.01); *C08K 5/17* (2013.01); *C08K 5/41* (2013.01); *C08L 55/02* (2013.01); *C09K 3/16* (2013.01); *C08K 2201/017* (2013.01)

(58) Field of Classification Search
CPC ... C08K 5/42; C08K 5/17; C08K 5/41; C08K 2201/017; C09K 3/16
USPC ........................................................ 524/156
See application file for complete search history.

(56) References Cited

U.S. PATENT DOCUMENTS

| | | | | |
|---|---|---|---|---|
| 4,113,679 A | * | 9/1978 | Andrascheck | ........... C08K 5/19 |
| | | | | 260/DIG. 15 |
| 2013/0123434 A1 | * | 5/2013 | Utsumi | ................... C08L 71/02 |
| | | | | 525/333.7 |
| 2015/0329698 A1 | | 11/2015 | Murata et al. | |

FOREIGN PATENT DOCUMENTS

| | | | |
|---|---|---|---|
| JP | H09-278936 A | | 10/1997 |
| JP | H10-036629 A | | 2/1998 |
| JP | 2009-249407 A | | 10/2009 |
| JP | 2010-47701 A | | 3/2010 |
| JP | 2012-246454 A | | 12/2012 |
| JP | 2013-136554 A | | 7/2013 |
| JP | 2013136554 A | * | 7/2013 |
| WO | WO 2013/129489 A1 | | 9/2013 |

OTHER PUBLICATIONS

Translation of JP 2013-136554, Jul. 11, 2013.*
International Search Report issued in PCT Application No. PCT/JP2014/058125, mailed Jun. 24, 2014.
International Preliminary Report on Patentability that issued in PCT Application No. PCT/JP2014/058125, dated Jan. 19, 2016, including English translation.

* cited by examiner

*Primary Examiner* — Hui Chin
(74) *Attorney, Agent, or Firm* — Dickinson Wright PLLC

(57) ABSTRACT

An antistatic agent for an ABS resin includes an ionically bonded salt

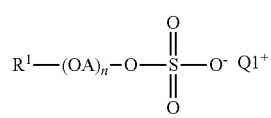

(1)

where $R_1$ is a substituted or unsubstituted straight, branched or cyclic $C_1$ to $C_{30}$ alkyl group, a substituted or unsubstituted $C_6$ to $C_{30}$ aryl group, or a substituted or unsubstituted $C_7$ to $C_{30}$ arylalkyl group, A is a straight or branched $C_2$ to $C_4$ alkylene group, n is an integer from 0 to 50, and $Q_1$ is a secondary or tertiary ammonium ion, or

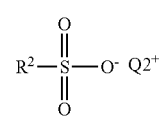

(2)

where $R_2$ is a substituted or unsubstituted straight, branched or cyclic $C_1$ to $C_{30}$ alkyl group, a substituted or unsubstituted $C_6$ to $C_{30}$ aryl group, or a substituted or unsubstituted $C_7$ to $C_{31}$ arylalkyl group, A is a straight or branched $C_2$ to $C_4$ alkylene group, and $Q_2$ is a secondary or tertiary ammonium ion.

11 Claims, No Drawings

ANTI-STATIC AGENT FOR ABS RESIN COMPOSITION, AND ABS RESIN COMPOSITION

TECHNICAL FIELD

The present invention relates to an antistatic agent for an ABS resin composition and an ABS resin composition.

BACKGROUND ART

ABS resin is one of materials widely used from miscellaneous goods to home electrical appliances, office automation equipment and auto parts. This ABS resin has high surface resistivity, and static electricity induced by for example contact and friction does not discharge and disappear easily. Therefore, there is a drawback in that dust is for example easily attached to the surface of a molded article during use and its beautiful appearance is lost.

A technique in which each antistatic agent is added to ABS resin by for example kneading has been previously proposed to improve such problems caused by static electricity. Patent Literature 1 for example discloses a technique in which an alkane sulfonic acid salt or an alkylbenzene sulfonic acid salt is added to ABS resin as an antistatic agent. Patent Literature 2 also discloses a technique in which an ionic liquid is added to a clear styrene thermoplastic resin such as ABS resin as an antistatic agent. In addition, Patent Literature 2 discloses anions such as trifluoromethanesulfonic acid, bistrifluoromethanesulfonyl imide, 1-butyl-3-methylimidazolium methanesulfonate, and 1-ethyl-3-methylimidazolium methanesulfonate as an anion that constitutes the ionic liquid added as an antistatic agent, and also discloses imidazolium, pyridinium, ammonium, phosphonium and sulfonium as a cation that constitutes the above-mentioned ionic liquid. Among these, as specific examples of ammonium cations, only quaternary ammonium cations such as trimethylpentyl ammonium and trimethylhexyl ammonium are disclosed.

CITATION LIST

Patent Literatures

Patent Literature 1: JP-10-36629 A
Patent Literature 2: JP-2009-249407 A

SUMMARY OF INVENTION

Technical Problem

The present inventors investigated the efficacy of the conventional techniques as described above. As a result, it was found that, even when an ionic liquid containing an alkylbenzene sulfonic acid salt as disclosed in the Patent Literature 1 or a quaternary ammonium cation as disclosed in the Patent Literature 2 is added to ABS resin as an antistatic agent, sufficient antistatic performances are not always obtained.

An object of the present invention is therefore to provide an antistatic agent capable of exerting antistatic performances superior to those of conventional antistatic agents for ABS resin when added to ABS resin, and an ABS resin composition containing such an antistatic agent.

Solution to Problem

The present inventors accumulated intensive investigations to solve the above-mentioned problems. As a result, they found that the above-mentioned problems can be solved by incorporating an ionically bonded salt having a specific chemical structure as an antistatic agent into an ABS resin composition, thereby the present invention was completed.

That is, according to an aspect of the present invention, there is provided an antistatic agent for ABS resin containing an ionically bonded salt represented by the following chemical formula (1) or the following chemical formula (2):

[Chem. 1]

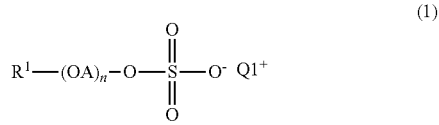
(1)

in the above chemical formula (1), $R^1$ is a substituted or unsubstituted straight, branched or cyclic alkyl group having 1 to 30 carbon atoms, a substituted or unsubstituted aryl group having 6 to 30 carbon atoms, or a substituted or unsubstituted arylalkyl group having 7 to 31 carbon atoms, A is a straight or branched alkylene group having 2 to 4 carbon atoms,
n is an integer from 0 to 50, and
$Q1^+$ is a secondary or tertiary ammonium ion,

[Chem. 2]

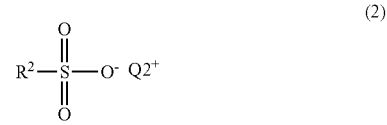
(2)

in the above chemical formula (2), $R^2$ is a substituted or unsubstituted straight, branched or cyclic alkyl group having 1 to 30 carbon atoms, a substituted or unsubstituted aryl group having 6 to 30 carbon atoms, or a substituted or unsubstituted arylalkyl group having 7 to 31 carbon atoms, and
$Q2^+$ is a secondary or tertiary ammonium ion.

In addition, according to another aspect of the present invention, there is also provided an ABS resin composition containing ABS resin and the above-described antistatic agent for ABS resin.

Further, according to yet another aspect of the present invention, there is also provided use of an ionically bonded salt represented by the above-mentioned chemical formula (1) or the above-mentioned chemical formula (2) (including respective ionically bonded salts corresponding to the preferred embodiments described in the description) as an antistatic agent for ABS resin.

In addition, according to yet another aspect of the present invention, there is also provided a method for improving the antistatic performances of ABS resin, the method including the step of adding an ionically bonded salt represented by the above-mentioned chemical formula (1) or the above-mentioned chemical formula (2) (including respective ionically bonded salts corresponding to the preferred embodiments described in the description) to ABS resin.

Effect of the Invention

According to the present invention, there are provided an antistatic agent capable of exerting antistatic performances superior to those of conventional antistatic agents for ABS resin when added to ABS resin and an ABS resin composition containing such an antistatic agent.

DESCRIPTION OF EMBODIMENTS

Ionically Bonded Salt (Antistatic Agent for ABS Resin)

An aspect of the present invention is an antistatic agent for ABS resin containing an ionically bonded salt represented by the following chemical formula (1) or the following chemical formula (2). In the antistatic agent for ABS resin involved in the present aspect, as such ionically bonded salt, salts of the chemical formula (1) can be used individually or two or more of the salts can be used in combination, salts of the chemical formula (2) can be used individually or two or more of the salts can be used in combination, or one or more salts of the chemical formula (1) and one or more salts of the chemical formula (2) can be used in combination. In this regard, however, it is preferable that at least one ionically bonded salt represented by the chemical formula (2) be used.

[Chem. 3]

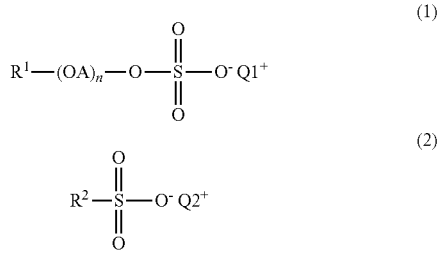

In the above chemical formulae (1) and (2), $R^1$ and $R^2$ are each independently a substituted or unsubstituted straight, branched or cyclic alkyl group having 1 to 30 carbon atoms, a substituted or unsubstituted aryl group having 6 to 30 carbon atoms, or a substituted or unsubstituted arylalkyl group having 7 to 31 carbon atoms.

Examples of substituted or unsubstituted straight, branched or cyclic alkyl groups having 1 to 30 carbon atoms used as $R^1$ and $R^2$ in the above chemical formulae (1) and (2) include for example methyl, ethyl, n-propyl, isopropyl, n-butyl, isobutyl, sec-butyl, tert-butyl, n-pentyl, isoamyl, tert-pentyl, neopentyl, n-hexyl, 3-methylpentan-2-yl, 3-methylpentan-3-yl, 4-methylpentyl, 4-methylpentan-2-yl, 1,3-dimethylbutyl, 3,3-dimethylbutyl, 3,3-dimethylbutan-2-yl, n-heptyl, 1-methylhexyl, 3-methylhexyl, 4-methylhexyl, 5-methylhexyl, 1-ethylpentyl, 1-(n-propyl)butyl, 1,1-dimethylpentyl, 1,4-dimethylpentyl, 1,1-diethylpropyl, 1,3,3-trimethylbutyl, 1-ethyl-2,2-dimethylpropyl, n-octyl, 2-methylhexan-2-yl, 2,4-dimethylpentan-3-yl, 1,1-dimethylpentan-1-yl, 2,2-dimethylhexan-3-yl, 2,3-dimethylhexan-2-yl, 2,5-dimethylhexan-2-yl, 2,5-dimethylhexan-3-yl, 3,4-dimethylhexan-3-yl, 3,5-dimethylhexan-3-yl, 1-methylheptyl, 2-methylheptyl, 5-methylheptyl, 2-methylheptan-2-yl, 3-methylheptan-3-yl, 4-methylheptan-3-yl, 4-methylheptan-4-yl, 1-ethylhexyl, 2-ethylhexyl, 1-propylpentyl, 2-propylpentyl, 1,1-dimethylhexyl, 1,4-dimethylhexyl, 1,5-dimethylhexyl, 1-ethyl-1-methylpentyl, 1-ethyl-4-methylpentyl, 1,1,4-trimethylpentyl, 2,4,4-trimethylpentyl, 1-isopropyl-1,2-dimethylpropyl, 1,1,3,3-tetramethylbutyl, n-nonyl, 1-methyloctyl, 6-methyloctyl, 1-ethylheptyl, 1-(n-butyl)pentyl, 4-methyl-1-(n-propyl)pentyl, 1,5,5-trimethylhexyl, 1,1,5-trimethylhexyl, 2-methyloctan-3-yl, n-decyl, 1-methylnonyl, 1-ethyloctyl, 1-(n-butyl)hexyl, 1,1-dimethyloctyl, 3,7-dimethyloctyl, n-undecyl, 1-methyldecyl, 1-ethylnonyl, n-dodecyl, n-tridecyl, n-tetradecyl, 1-methyltridecyl, n-pentadecyl, n-hexadecyl, n-heptadecyl, n-octadecyl, n-nonadecyl, n-eicosyl, 1,2-bis(2-ethylhexyloxycarbonyl)ethyl, cyclopropyl, cyclobutyl, cyclopentyl, cyclohexyl, cyclooctyl and the like. In terms of antistatic performances, a substituted or unsubstituted straight or branched alkyl group having 1 to 8 carbon atoms is preferable, 2-ethylhexyl, dodecyl, tridecyl and 1,2-bis(2-ethylhexyloxycarbonyl)ethyl are more preferable, and 2-ethylhexyl is particularly preferable.

Examples of substituted or unsubstituted aryl groups having 6 to 30 carbon atoms used as $R^1$ and $R^2$ in the above chemical formulae (1) and (2) include, for example, phenyl, dimethylphenyl (such as 2,3-dimethylphenyl, 2,4-dimethylphenyl, 3,4-dimethylphenyl), isopropylphenyl (2-isopropylphenyl, 3-isopropylphenyl, 4-isopropylphenyl), dodecylphenyl (2-dodecylphenyl, 3-dodecylphenyl, 4-dodecylphenyl), biphenyl, 1-naphthyl, 2-naphthyl, 9-anthryl, 9-phenanthryl, 1-pyrenyl, 5-naphthacenyl, 1-indenyl, 2-azulenyl, 9-fluorenyl, terphenyl, quaterphenyl, mesityl, pentalenyl, binaphthalenyl, ternaphthalenyl, quaternaphthalenyl, heptalenyl, biphenylenyl, indacenyl, fluoranthenyl, acenaphthylenyl, aceanthrylenyl, phenalenyl, fluorenyl, anthryl, bianthracenyl, teranthracenyl, quateranthracenyl, anthraquinolyl, phenanthryl, triphenylenyl, pyrenyl, chrysenyl, naphthacenyl, playadenyl, picenyl, perylenyl, pentaphenyl, pentacenyl, tetraphenylenyl, hexaphenyl, hexacenyl, rubicenyl, coronenyl, trinaphthylenyl, heptaphenyl, heptacenyl, pyranthrenyl, obarenyl and the like. In terms of antistatic performances, a substituted or unsubstituted aryl group having 8 to 18 carbon atoms is preferable, dimethylphenyl (such as 2,3-dimethylphenyl, 2,4-dimethylphenyl, 3,4-dimethylphenyl), isopropylphenyl (2-isopropylphenyl, 3-isopropylphenyl, 4-isopropylphenyl), dodecylphenyl (2-dodecylphenyl, 3-dodecylphenyl, 4-dodecylphenyl) are more preferable, and isopropylphenyl is particularly preferable.

Examples of substituted or unsubstituted arylalkyl groups having 7 to 31 carbon atoms used as $R^1$ and $R^2$ in the above chemical formulae (1) and (2) include for example benzyl, phenylethyl, 3-phenylpropyl, 1-naphthylmethyl, 2-naphthylmethyl, 2-(1-naphthyl)ethyl, 2-(2-naphthyl)ethyl, 3-(1-naphthyl)propyl or 3-(2-naphthyl)propyl or the like.

Preferred examples of groups used as $R^1$ in the above chemical formula (1) include those having chemical structures represented by the following chemical formulae (3) to (6).

[Chem. 4]

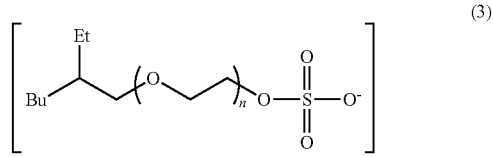

(particularly, n = 1 or 2 is preferable and n = 2 is more preferable)

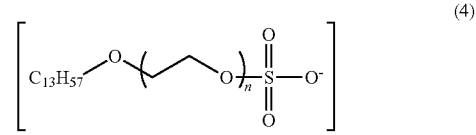

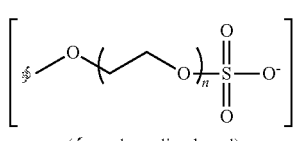

($ : polycyclic phenyl)

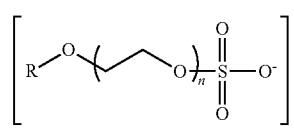

(R = C12-C13)

Preferable examples of groups used as $R^2$ in the above chemical formula (2) include those having chemical structures of the following chemical formulae (7) to (10), and among these, a group having a chemical structure of the following chemical formula (9) is preferable.

[Chem. 5]

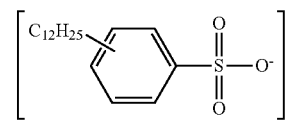

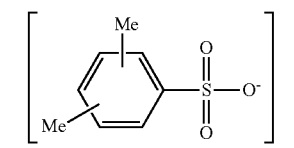

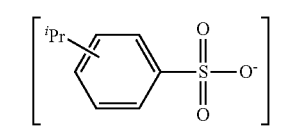

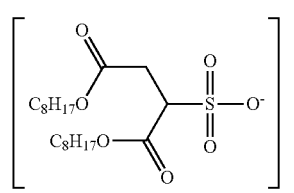

In the above chemical formula (1), A is a straight or branched alkylene group having 2 to 4 carbon atoms. Examples of straight or branched alkylene groups having 2 to 4 carbon atoms used as A in the above chemical formula (1) include for example ethylene, propylene, butylene and the like. In terms of easy accessibility, ethylene and propylene are particularly preferable.

Hydrogen atoms in the aforementioned straight, branched or cyclic alkyl group having 1 to 30 carbon atoms, aryl group having 6 to 30 carbon atoms, or arylalkyl group having 7 to 31 carbon atoms, and straight or branched alkylene group having 2 to 4 carbon atoms may be substituted with other substituents.

Examples of such substituents include halogens such as fluorine, chlorine, bromine and iodine, alkyl such as methyl, ethyl, tert-butyl and dodecyl, aryl such as phenyl, p-tolyl, xylyl, cumenyl, naphthyl, anthryl and phenanthryl, alkoxy such as methoxy, ethoxy and tert-butoxy, aryloxy such as phenoxy and p-tolyloxy, alkoxycarbonyl such as methoxycarbonyl, butoxycarbonyl, 2-ethylhexyloxycarbonyl and phenoxycarbonyl, acyloxy such as acetoxy, propionyloxy and benzoyloxy, acyl such as acetyl, benzoyl, isobutyryl, acryloyl, methacryloyl and methoxalyl, alkylsulfanyl such as methylsulfanyl and tert-butylsulfanyl, arylsulfanyl such as phenylsulfanyl and p-tolylsulfanyl, alkylamino such as methylamino and cyclohexylamino, dialkylamino such as dimethylamino, diethylamino, morpholino and piperidino, arylamino such as phenylamino and p-tolylamino, and the like, and further hydroxy, carboxy, formyl, mercapto, sulfo, mesyl, p-toluenesulfonyl, amino, nitro, cyano, trifluoromethyl, trichloromethyl, trimethylsilyl, phosphinico, phosphono and the like.

n in the above chemical formula (1) is an integer from 0 to 50. In terms of handleability due to for example a viscosity decrease or interface characteristics, n is preferably an integer from 1 to 50, more preferably an integer from 1 to 50, and particularly preferably an integer from 1 to 10.

In the above chemical formulae (1) and (2), $Q1^+$ and $Q2^+$ are each independently a secondary ammonium ion or a tertiary ammonium ion. Here, the secondary ammonium ion and tertiary ammonium ion representing $Q1^+$ and $Q2^+$ can be both represented by the following chemical formula.

[Chem. 6]

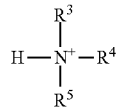

In the chemical formula, $R^3$ is a hydrogen atom or a straight, branched or cyclic alkyl group having 1 to 30 carbon atoms. In addition, $R^4$ and $R^5$ are each independently a straight, branched or cyclic alkyl group having 1 to 30 carbon atoms which may be substituted with hydroxy or alkoxy. Here, when $R^3$ is a hydrogen atom, an ammonium ion represented by the above-mentioned chemical formula is secondary, and when $R^3$ is the above-designated alkyl group, an ammonium ion represented by the above-mentioned chemical formula is tertiary. Particularly, it is preferable that $R^3$ be a hydrogen atom (i.e. $Q1^+$ and $Q2^+$ are a secondary ammonium ion). It is also preferable that only either one of $R^4$ and $R^5$ be a straight, branched or cyclic alkyl group having 1 to 30 carbon atoms which is substituted with hydroxy or alkoxy, and in this case, the substituted alkyl group is more preferably a hydroxy-substituted alkyl group, and particularly preferably hydroxyethyl. It is noted that about specific examples of "straight, branched or cyclic alkyl group having 1 to 30 carbon atoms", detailed explanation is omitted because those listed above can be also used herein. In addition, when $R^4$ and/or $R^5$ is an alkoxy-substituted alkyl group, examples of alkoxy as such substituents include alkoxy having 1 to 8 carbon atoms such as methoxy, ethoxy, propoxy, butoxy and 2-ethylhexyloxy.

Specific examples of $Q1^+$ and $Q2^+$ as described above include, as secondary ammonium ions ($R^3$=hydrogen atom), ions obtained by protonating dimethylamine, diethylamine, di-1-propylamine, di-2-propylamine, di-n-butylamine, di-2-butylamine, di-1-pentylamine, di-2-pentylamine, di-3-pentylamine, dineopentylamine, dicyclopentylamine, di-1-hexylamine, di-2-hexylamine, di-3-hexylamine, dicyclohexylamine, methylethanolamine and ethylethanolamine, and the like, and as tertiary ammonium ions ($R^3$=alkyl), ions obtained by protonating trimethylamine, triethylamine, tri-1-propylamine, tri-2-propylamine, tri-n-butylamine, tri-2-butylamine, tri-1-pentylamine, tri-2-pentylamine, tri-3-pentylamine, trineopentylamine, tricyclopentylamine, tri-1-hexylamine, tri-2-hexylamine, tri-3-hexylamine, tricyclohexylamine, dimethylethanolamine, ethylmethylethanolamine, diethylethanolamine, lauryldiethanolamine and bis(2-methoxyethyl)methylamine, and the like. Among these, an ion obtained by protonating methylethanolamine, ethylethanolamine, diethylethanolamine or lauryldiethanolamine is further preferable, an ion obtained by protonating methylethanolamine, ethylethanolamine or lauryldiethanolamine is more preferable, an ion obtained by protonating methylethanolamine or ethylethanolamine is particularly preferable, and an ion obtained by protonating ethylethanolamine is most preferable.

More preferred compounds of ionically bonded salts represented by the above chemical formula (1) include ionically bonded salts represented by the following chemical formulae (11) to (19). Among these, an ionically bonded salt represented by the following chemical formula (11) to (13), (17) or (18) is preferable especially in terms of high antistatic performances, an ionically bonded salt represented by the following chemical formula (11), (13), (17) or (18) is more preferable, and an ionically bonded salt represented by the following chemical formula (11) or (17) is most preferable.

[Chem. 7]

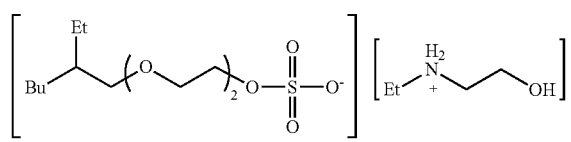

(11)

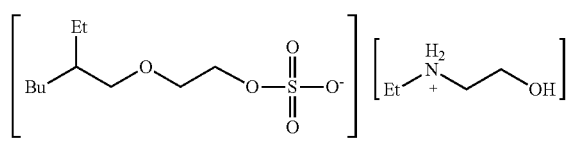

(12)

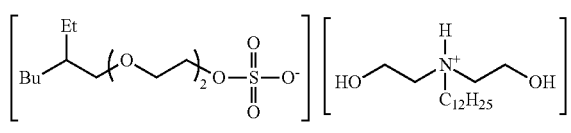

(13)

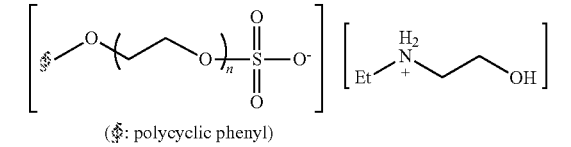

(14)

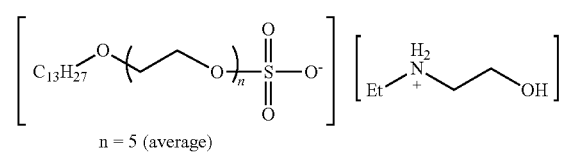

($\ast$: polycyclic phenyl)

(15)

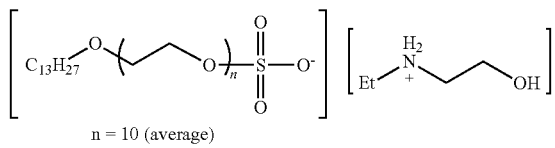

n = 5 (average)

[Chem. 8]

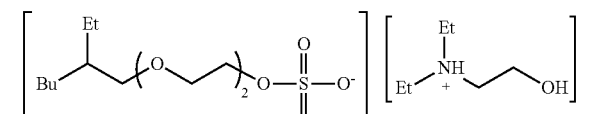

n = 10 (average)

(16)

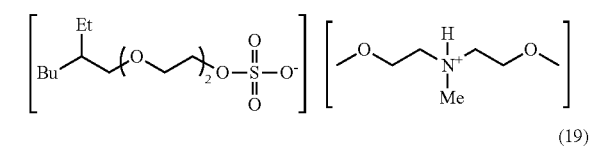

(17)

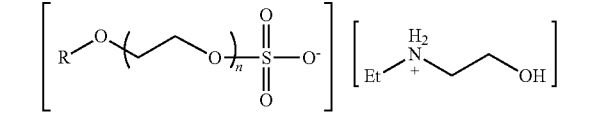

(18)

(19)

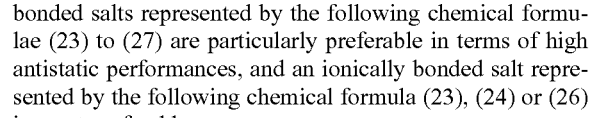

In addition, more preferred compounds of ionically bonded salts represented by the above chemical formula (2) include ionically bonded salts represented by the following chemical formulae (20) to (27). Among these, ionically bonded salts represented by the following chemical formulae (23) to (27) are particularly preferable in terms of high antistatic performances, and an ionically bonded salt represented by the following chemical formula (23), (24) or (26) is most preferable.

[Chem. 9]

(20)

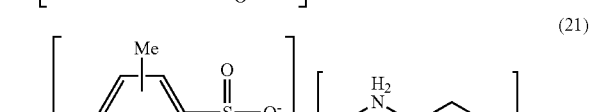

(21)

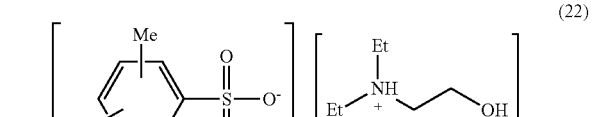

(22)

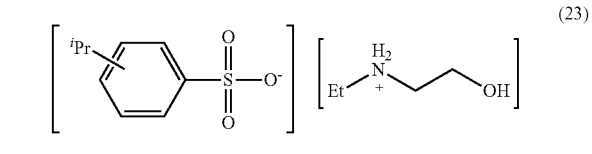

(23)

[Chem. 10]

-continued

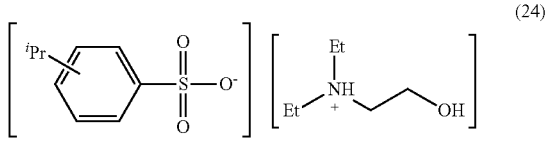

(24)

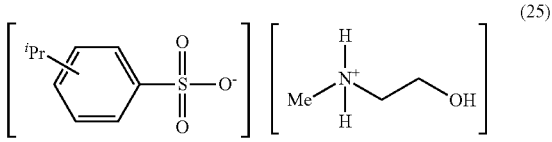

(25)

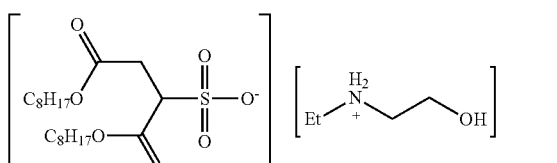

(26)

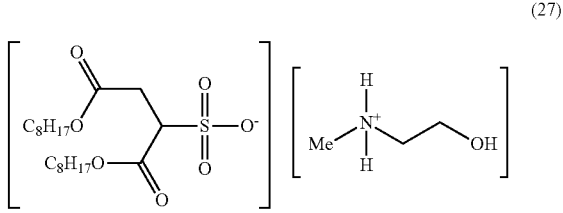

(27)

Methods for producing the above ionically bonded salt are not particularly limited, and examples thereof include an anion exchange method, a neutralization method, an acid ester method and the like. A deammoniation method in which an ionically bonded salt is obtained by allowing a sulfuric acid ester ammonium salt or a sulfonic acid ester ammonium salt to react with a nitrogen-containing compound to distill off ammonia and the like are also suitably used. It is noted that each of $C_8H_{17}$—, $C_{12}H_{25}$— and $C_{13}H_{27}$— described in the above chemical formulae (4), (6), (7) and (10) and the above chemical formulae (15), (16), (19), (20), (26) and (27) may be a straight chain or a branched chain. $C_8H_{17}$— can be for example 2-ethylhexyl.

As the antistatic agent for ABS resin involved in the present mode, the above-described ionically bonded salt may be directly used or may be in the masterbatch form in which the above-mentioned antistatic agent with a concentration equal to or higher than a concentration used is combined with ABS resin.

[ABS Resin Composition]

According to another aspect of the present invention, there is also provided an ABS resin composition containing ABS resin and the antistatic agent for ABS resin involved in the above-described mode.

"ABS resin" generally means a resin obtained by uniformly dispersing "polybutadiene" (PBD) in "AS resin", a copolymer of acrylonitrile (AN) and styrene (ST). Resin constitution properly varies depending on the properties required, and as the copolymer composition ratio, the weight ratio of monomer composition in the AS resin phase is generally ST/AN=90/10 to 50/50, and it is generally preferable that production be carried out at a weight ratio of ST/AN=75/25.

Then, a monomer such as methyl methacrylate (MMA), α-methyl styrene (AMS) or N-phenyl maleimide (PMI) may be added as a copolymer component of the AS resin phase during production to improve the properties.

In the meantime, the constituent amount of polybutadiene component is 10 to 80% with respect to 100 parts by weight of ABS resin and it is generally preferable that the component be used at 10 to 30%. Further, styrene butadiene rubber (SBR), acrylic rubber (AR), a copolymer of ethylene and propylene (EPR), chlorinated polyethylene (CPE) and the like may be added as needed along with a polybutadiene component during production to improve properties. The constituent ratios of these are also known.

ABS resin as described above may be used individually or two or more of the resins with different component ratios may be combined. In addition, methods for producing those are not particularly limited, and those produced by for example known suspension polymerization, emulsion polymerization and bulk polymerization can be used.

The amount of the above-mentioned antistatic agent for ABS resin contained in an ABS resin composition is preferably 0.1 to 50 wt % with respect to 100 wt % of ABS resin composition, more preferably 1 to 30 wt %.

Furthermore, an ABS resin composition may further contain a thermoplastic resin other than ABS resin. Thermoplastic resins which can be used in this case include polycarbonate, polybutylene terephthalate, polyethylene terephthalate, polynaphthalene terephthalate, polyamide and the like, and among these, include preferably polycarbonate, polybutylene terephthalate and polyamide. The amount of these thermoplastic resins contained is 1 wt % or more and 50 wt % or less with respect to 100 wt % of ABS resin composition, preferably 10 wt % or more and 50 wt % or less in which the properties of thermoplastic resin are expressed, and the further preferred mixing ratio is 20 wt % or more and 50 wt % or less.

The ABS resin composition involved in the present mode may contain a variety of additives as needed. Such additives include fibrous reinforcing agents such as glass fibers, metallic fibers, aramid fibers, ceramic fibers, potassium titanate whisker and carbonate fibers, a variety of fillers such as talc, calcium carbonate, mica, clay, titanium oxide, aluminum oxide, glass flakes, milled fibers, metal flakes and metal powders, heat stabilizers as typified by phosphoric acid esters and phosphorous acid esters, or additives such as catalyst deactivating agents, oxidation stabilizers, light stabilizers, ultraviolet absorbers, lubricants, pigments, flame retardants, flame retardant promoters and plasticizers. The amount of these additives contained is not also particularly limited, and usually about 0.1 to 20 wt % with respect to 100 wt % of ABS resin composition.

According to the present invention, there are provided an antistatic agent capable of stably exerting sufficient antistatic performances over a long period of time, and an ABS resin composition containing such antistatic agent. Therefore, the ABS resin composition involved in the present mode is useful for, for example, office automation equipment, electronic members, car housings, medical members, a variety of containers, covers, films and sheets.

PREFERRED EMBODIMENTS OF THE INVENTION

Some of the preferred embodiments of the present invention will be described as follows.

(1) An antistatic agent for ABS resin, containing an ionically bonded salt represented by the following chemical formula (1) or the following chemical formula (2):

[Chem. 11]

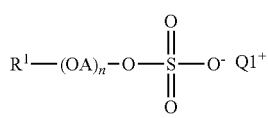
(1)

in the above chemical formula (1). $R^1$ is a substituted or unsubstituted straight, branched or cyclic alkyl group having 1 to 30 carbon atoms, a substituted or unsubstituted aryl group having 6 to 30 carbon atoms, or a substituted or unsubstituted arylalkyl group having 7 to 31 carbon atoms, and, when substituted, $R^1$ is substituted with a halogen atom, alkyl, aryl, alkoxy, aryloxy, alkoxycarbonyl, acyloxy, acyl, alkylsulfanyl, arylsulfanyl, alkylamino, dialkylamino, arylamino, hydroxy, carboxy, formyl, mercapto, sulfo, mesyl, p-toluenesulfonyl, amino, nitro, cyano, trifluoromethyl, trichloromethyl, trimethylsilyl, phosphinico or phosphono group, A is a straight or branched alkylene group having 2 to 4 carbon atoms, n is an integer from 0 to 50, and $Q1^+$ is a hydroxy-containing secondary or tertiary ammonium ion,

[Chem. 12]

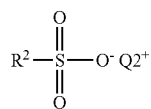
(2)

in the above chemical formula (2), $R^2$ is a substituted or unsubstituted straight, branched or cyclic alkyl group having 1 to 30 carbon atoms, a substituted or unsubstituted aryl group having 6 to 30 carbon atoms, or a substituted or unsubstituted arylalkyl group having 7 to 31 carbon atoms, and, when substituted, $R^2$ is substituted with a halogen atom, alkyl, aryl, alkoxy, aryloxy, alkoxycarbonyl, acyloxy, acyl, alkylsulfanyl, arylsulfanyl, alkylamino, dialkylamino, arylamino, hydroxy, carboxy, formyl, mercapto, sulfo, mesyl, p-toluenesulfonyl, amino, nitro, cyano, trifluoromethyl, trichloromethyl, trimethylsilyl, phosphinico or phosphono group, $Q2^+$ is a hydroxy-containing secondary or tertiary ammonium ion;

(2) the antistatic agent for ABS resin according to (1) above, containing an ionically bonded salt represented by the above chemical formula (2);

(3) the antistatic agent for ABS resin according to (1) or (2) above, wherein $Q1^+$ and $Q2^+$ are a secondary ammonium ion;

(4) the antistatic agent for ABS resin according to any one of (1) to (3) above, wherein $Q1^+$ and $Q2^+$ have a structure in which hydroxyethyl is bound to a nitrogen atom;

(5) the antistatic agent for ABS resin according to (1) above, wherein the ionically bonded salt is represented by any of the following chemical formulae (11) to (13), (17), (23) to (27);

[Chem. 13]

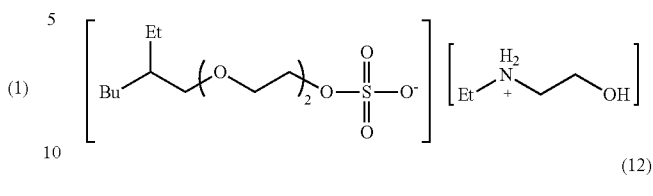
(11)

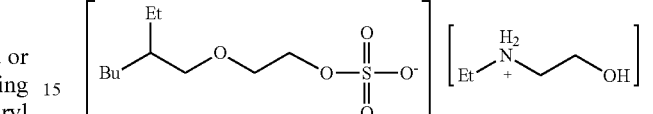
(12)

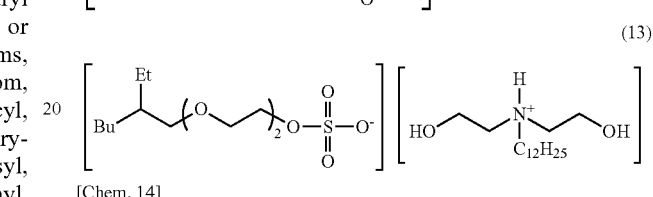
(13)

[Chem. 14]

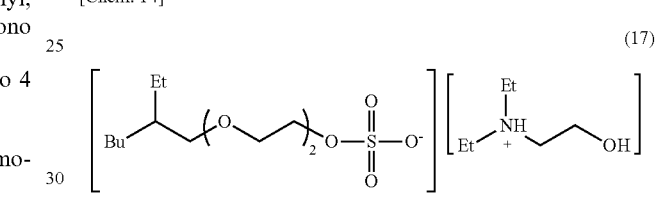
(17)

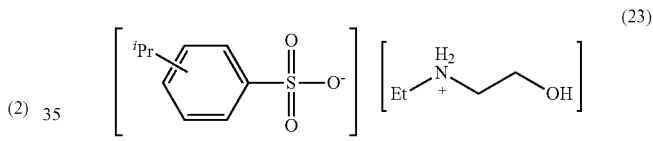
(23)

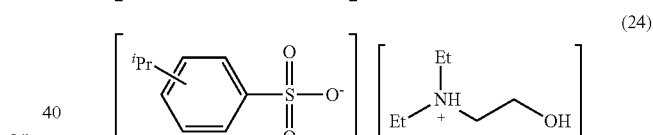
(24)

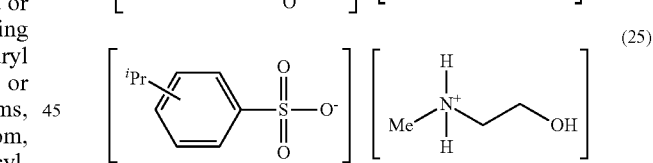
(25)

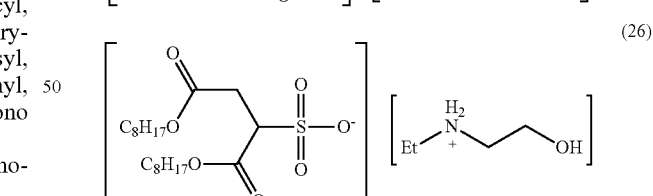
(26)

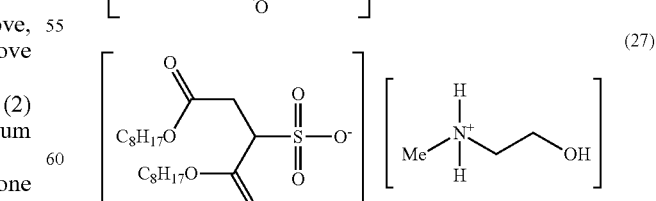
(27)

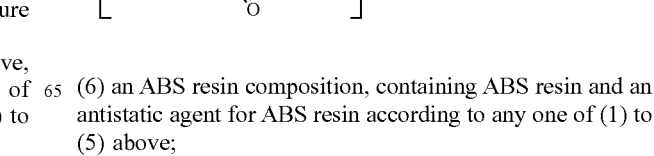

(6) an ABS resin composition, containing ABS resin and an antistatic agent for ABS resin according to any one of (1) to (5) above;

(7) the use of an ionically bonded salt represented by the above chemical formula (1) or the above chemical formula (2) (including respective ionically bonded salts corresponding to the preferred embodiments according to (2) to (6) above) as an antistatic agent for ABS resin; and (8) a method for improving the antistatic performances of ABS resin, the method including the step of adding an ionically bonded salt represented by the above chemical formula (1) or the above chemical formula (2) (including respective ionically bonded salts corresponding to the preferred embodiments according to (2) to (6) above) to ABS resin.

EXAMPLES

The present invention will now be described in more detail by way of examples thereof. In this regard, however, it should be noted that the present invention is not limited to the following examples. In addition, evaluation items in the examples and the like were measured as mentioned below.

Example 1

In Example 1, N-ethylaminoethanol cumene sulfonate ([MEM][Cum-$SO_3$]) represented by the following chemical formula (the chemical formula (23) in the description) was prepared as an antistatic agent for ABS resin.

[Chem. 15]

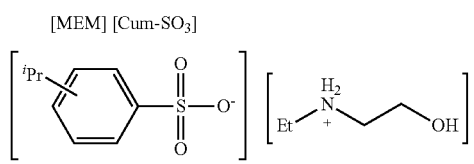

[MEM] [Cum-$SO_3$]    (23)

Comparative Example 1

In Comparative Example 1, sodium cumene sulfonate ([Na][Cum-$SO_3$]) represented by the following chemical formula was prepared as an antistatic agent for ABS resin.

[Chem. 16]

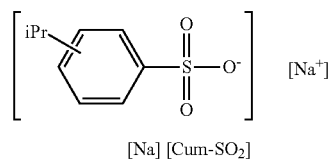

[Na] [Cum-$SO_2$]

Comparative Example 2

In Comparative Example 2, tributylmethylammonium bis trifluoromethanesulfonyl imide ([$N_{1,4,4,4}$][TFSA]; reagent; manufactured by Tokyo Chemical Industry Co., Ltd.) represented by the following chemical formula was prepared as an antistatic agent for ABS resin.

[Chem. 17]

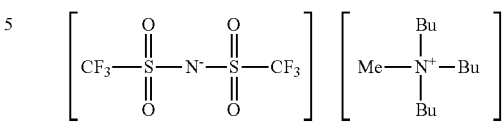

[$N_{1,4,4,4}$] [TFSA]

[Evaluation Example 1 of ABS Resin Composition]

To 100 parts by weight of ABS resin (TOYOLAC (registered trademark) 700X01; manufactured by Toray Industries, Inc.), 2 parts by weight of each antistatic agent for ABS resin in the above-described Example 1, and Comparative Example 1 and Comparative Example 2 was added, and the obtained mixture was kneaded and extruded (palletization) using a twin screw segment extruder and a test piece was produced by mold injection. With respect to each test piece thus obtained, surface resistivity (by JIS K6911: 2006 "Testing methods for thermosetting plastics"), tensile strength (by JIS K7162: 1994 "Plastics-Determination of tensile properties"), bending strength and flexural modulus (both by JIS K7171: 2008 "Plastics-Determination of flexural properties"), and deflection temperature under load (by JIS K7191-1, 2: 2007 "Plastics-Determination of temperature of deflection under load—Part 1 General principles, Part 2: Plastics and ebonite" were measured.

In addition, a test piece after measurement of surface resistivity was exposed to running tap water (about 1 L) for 30 seconds, then rinsed with ion exchange water, and dried at 110° C. for 5 minutes after wiping up water drops. Except that the surface resistivity of a test piece after carrying out this step once was measured, surface resistivity after water washing was measured in the same manner as above. The measurement results are shown in Table 1 given below. It is noted that "BLANK" in Table 1 means the evaluation results of ABS resin (TOYOLAC 700X01) to which an antistatic agent was not added.

TABLE 1

| | EXAMPLE 1: [MEM] [Cum-$SO_3$] | | | |
|---|---|---|---|---|
| | Test items | | | |
| | Blank | Example 1 | Comparative Example 1 | Comparative Example 2 |
| Surface resistivity (Ω/sq.) | $10^{13}$ or more (over) | $7 \times 10^9$ | $2 \times 10^{11}$ | $2 \times 10^{10}$ |
| Surface resistivity after water washing (Ω/sq.) | $10^{13}$ or more (over) | $6 \times 10^{11}$ | $10^{13}$ or more (over) | $10^{13}$ or more (over) |
| Tensile strength (MPa) | 47.0 | 47.9 | 46.7 | 47.9 |
| Bending strength (MPa) | 75.0 | 69.9 | 69.3 | 68.7 |
| Flexural modulus (MPa) | 2350 | 2270 | 2330 | 2250 |
| Deflection temperature under load (° C.) | 81 | 76 | 79 | 78 |

[Evaluation Example 2 of ABS Resin Composition]

To 100 parts by weight of ABS resin (STYLAC (registered trademark)-ABS190F; manufactured by Asahi Kasei Chemicals Corp.), 1 part by weight, 2 parts by weight, 5 parts by weight, 10 parts by weight or 20 parts by weight of antistatic agent for ABS resin described in Example 1 was added, and the obtained mixture was kneaded and extruded (palletization) in the same manner as in the above-mentioned evaluation example 1 and a test piece was produced by mold injection. With respect to each test piece thus obtained, surface resistivity and surface resistivity after water washing were measured in the same manner as in the above-mentioned evaluation example 1. The measurement results are shown in Table 2 given below. It is noted that "BLANK" in Table 2 means the evaluation results of ABS resin (STYLAC-ABS190F) to which an antistatic agent was not added.

TABLE 2

| | EXAMPLE 1: [MEM] [Cum-SO₃] | | | | | |
|---|---|---|---|---|---|---|
| Added amount | 0 parts by weight (BLANK) | 1 part by weight | 2 parts by weight | 5 parts by weight | 10 parts by weight | 20 parts by weight |
| Surface resistivity (Ω/sq.) | $10^{13}$ or more (over) | $6 \times 10^8$ | $3 \times 10^8$ | $3 \times 10^9$ | $5 \times 10^7$ | $2 \times 10^7$ |
| Surface resistivity after water washing (Ω/sq.) | $10^{13}$ or more (over) | $5 \times 10^{11}$ | $2 \times 10^{11}$ | $4 \times 10^9$ | $2 \times 10^9$ | $2 \times 10^7$ |

Example 2

In Example 2, an ionically bonded salt ([MEM][DOSS]) represented by the following chemical formula (the chemical formula (26) in the description) was prepared as an antistatic agent for ABS resin.

[Chem. 18]

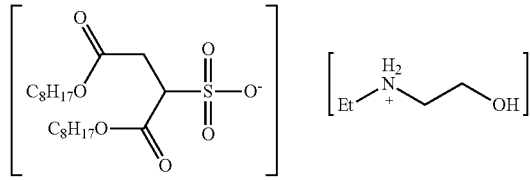

]MEM] [DOSS]
(26)

Example 3

In Example 3, an ionically bonded salt ([MEM][EHDG-S]) represented by the following chemical formula (the chemical formula (11) in the description) was prepared as an antistatic agent for ABS resin.

[Chem. 19]

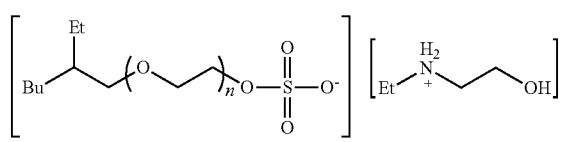

[MEM] [EHDG-S]
(11)

Example 4

In Example 4, an ionically bonded salt ([2A][Cum-SO₃]) represented by the following chemical formula (the chemical formula (24) in the description) was prepared as an antistatic agent for ABS resin.

[Chem. 20]

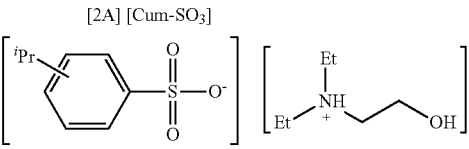

[2A] [Cum-SO₃]
(24)

Example 5

In Example 5, an ionically bonded salt ([2A][EHDG-S]) represented by the following chemical formula (the chemical formula (17) in the description) was prepared as an antistatic agent for ABS resin.

[Chem. 21]

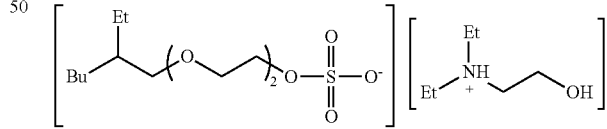

[2A] [EHDG-S]
(17)

[Evaluation Example 3 of ABS Resin Composition]

Using the above-described antistatic agents for ABS resin in Examples 2 to 5 and Comparative Examples 1 to 2, the surface resistivity of a test piece produced in the same manner as in the above-described "Evaluation Example 2 of ABS Resin Composition" was measured. The measurement results are shown in Table 3 given below. It is noted that the amount of antistatic agents for ABS resin added was 2 parts by weight in the present evaluation example.

TABLE 3

| | Ionically bonded salt | Surface resistivity (Ω/sq.) |
|---|---|---|
| Comparative Example 1 | [Na] [Cum-SO$_3$] | $1 \times 10^{12}$ |
| Comparative Example 2 | [N$_{1,4,4,4}$] [TFSA] | $1 \times 10^{13}$ |
| Example 1 | [MEM] [Cum-SO$_3$] | $3 \times 10^8$ |
| Example 2 | [MEM] [DOSS] | $2 \times 10^9$ |
| Example 3 | [MEM] [EHDG-S] | $3 \times 10^8$ |
| Example 4 | [2A] [Cum-SO$_3$] | $2 \times 10^9$ |
| Example 5 | [2A] [EHDG-S] | $3 \times 10^{10}$ |

When the surface resistivity after water washing of test pieces in Examples 2, 4 and 5 was measured in the same manner as in the above-described "Evaluation Example 2 of ABS Resin Composition", all the pieces showed a value of $2 \times 10^{12}$ or less. In addition, the surface resistivity after water washing of test pieces in Comparative Examples 1 to 2 was all over ($10^{13}$ or more).

From the above results, it is found that, according to the present invention, when an ionically bonded salt having a specific structure is added to ABS resin as an antistatic agent, antistatic performances superior to those of known conventional antistatic agents for ABS resin can be exerted. In particular, since high antistatic performances can be maintained even after water washing, it is understood that the ionically bonded salts involved in the present invention are very useful antistatic agents for ABS resin.

In addition, from the results shown in Table 2, it is also found that by using an ionically bonded salt involved in the present invention as an antistatic agent for ABS resin, superior antistatic performances can be exerted even when the amount added is smaller than that of known conventional antistatic agents.

It is noted that the ionically bonded salts in Examples 1 to 5 in the present invention do not have halogen in their structures unlike the ionically bonded salt involved in Comparative Example 2. In addition, the ionically bonded salts involved in the present invention can be produced without using any halogen even in their raw materials by selecting a synthetic method. In this case, the ionically bonded salts can be suitably used when the use of halogen is avoided, for example for the purposes of cases of electronic devices and a decrease in environmental burden, which is preferable.

This application claims priority on Japanese patent application No. 2013-150853 filed on Jul. 19, 2013 and Japanese patent application No. 2013-173951 filed on Aug. 23, 2013, and the above-mentioned applications are incorporated herein by reference.

The invention claimed is:

1. A method for improving the antistatic performances of ABS resin, the method comprising the step of adding an ionically bonded salt represented by a following chemical formula (1) or a following chemical formula (2) to the ABS resin:

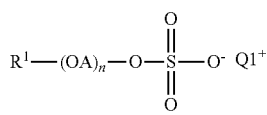

(1)

in the above chemical formula (1), R$^1$ is a substituted or unsubstituted straight, branched or cyclic alkyl group having 2 to 30 carbon atoms, a substituted or unsubstituted aryl group having 6 to 30 carbon atoms, or a substituted or unsubstituted arylalkyl group having 7 to 31 carbon atoms, and, when substituted, R$^1$ is substituted with a halogen atom, alkyl, aryl, alkoxy, aryloxy, alkoxycarbonyl, acyloxy, acyl, alkylsulfanyl, arylsulfanyl, alkylamino, dialkylamino, arylamino, hydroxy, carboxy, formyl, mercapto, sulfo, mesyl, p-toluenesulfonyl, amino, nitro, cyano, trifluoromethyl, trichloromethyl, trimethylsilyl, phosphinico or phosphono group, A is a straight or branched alkylene group having 2 to 4 carbon atoms, n is an integer from 0 to 50, and Q1$^+$ is a hydroxy-containing secondary or tertiary ammonium ion,

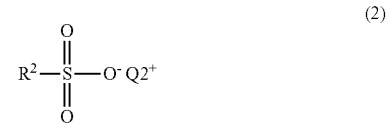

(2)

in the above chemical formula (2), R$^2$ is a substituted or unsubstituted straight, branched or cyclic alkyl group having 1 to 30 carbon atoms, a substituted or unsubstituted aryl group having 6 to 30 carbon atoms, or a substituted or unsubstituted arylalkyl group having 7 to 31 carbon atoms, and, when substituted, R$^2$ is substituted with a halogen atom, alkyl, aryl, alkoxy, aryloxy, alkoxycarbonyl, acyloxy, acyl, alkylsulfanyl, arylsulfanyl, alkylamino, dialkylamino, arylamino, hydroxy, carboxy, formyl, mercapto, sulfo, mesyl, p-toluenesulfonyl, amino, nitro, cyano, trifluoromethyl, trichloromethyl, trimethylsilyl, phosphinico or phosphono group, and Q2$^+$ is a hydroxy-containing secondary or tertiary ammonium ion.

2. The method according to claim 1, wherein the ionically bonded salt represented by the above chemical formula (2) is added to the ABS resin.

3. The method according to claim 1, wherein Q1$^+$ and Q2$^+$ are a secondary ammonium ion.

4. The method according to claim 1, wherein Q1$^+$ and Q2$^+$ have a structure in which hydroxyethyl group is bound to a nitrogen atom.

5. The method according to claim 1, wherein the ionically bonded salt is represented by any of following chemical formulae (11) to (13), (17), (23) to (27).

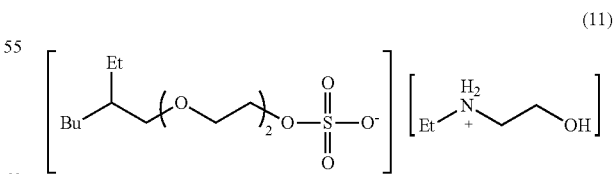

(11)

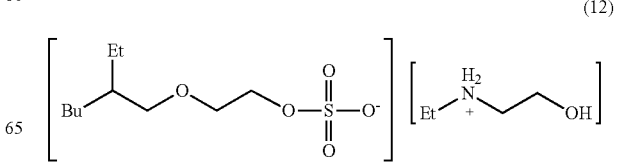

(12)

-continued

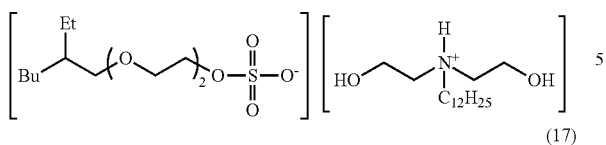  (13)

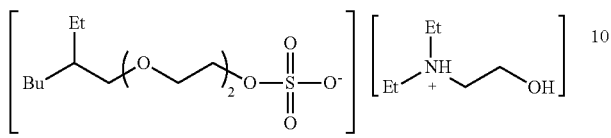  (17)

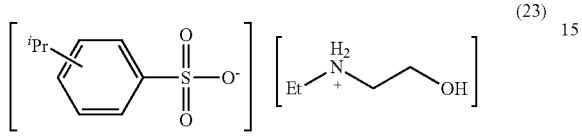  (23)

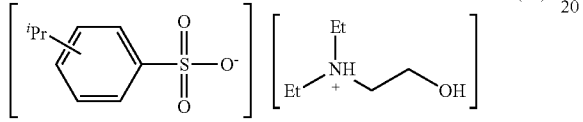  (24)

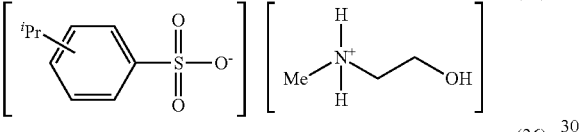  (25)

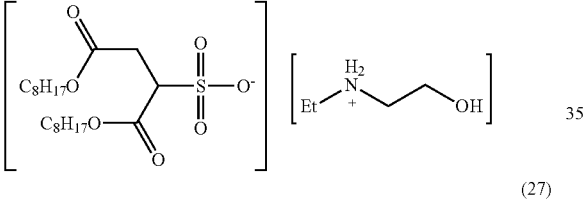  (26)

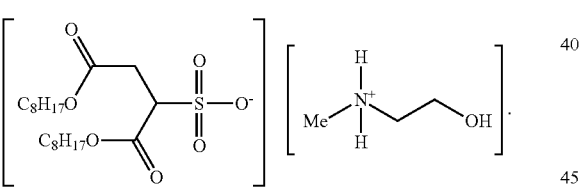  (27)

6. An ABS resin composition, comprising ABS resin and an ionically bonded salt represented by the following chemical formula (1) or the following chemical formula (2):

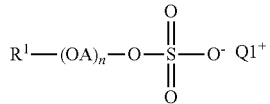  (1)

in the above chemical formula (1), $R^1$ is a substituted or unsubstituted straight, branched or cyclic alkyl group having 2 to 30 carbon atoms, a substituted or unsubstituted aryl group having 6 to 30 carbon atoms, or a substituted or unsubstituted arylalkyl group having 7 to 31 carbon atoms, and, when substituted, $R^1$ is substituted with a halogen atom, alkyl, aryl, alkoxy, aryloxy, alkoxycarbonyl, acyloxy, acyl, alkylsulfanyl, arylsulfanyl, alkylamino, dialkylamino, arylamino, hydroxy, carboxy, formyl, mercapto, sulfo, mesyl, p-toluenesulfonyl, amino, nitro, cyano, trifluoromethyl, trichloromethyl, trimethylsilyl, phosphinico or phosphono group, A is a straight or branched alkylene group having 2 to 4 carbon atoms, n is an integer from 0 to 50, $Q1^+$ is a hydroxy-containing secondary or tertiary ammonium ion, $$R^2-\underset{\underset{O}{\|}}{\overset{\overset{O}{\|}}{S}}-O^- \quad Q2^+ \quad (2)$$

in the above chemical formula (2), $R^2$ is a substituted or unsubstituted straight, branched or cyclic alkyl group having 1 to 30 carbon atoms, a substituted or unsubstituted aryl group having 6 to 30 carbon atoms, or a substituted or unsubstituted arylalkyl group having 7 to 31 carbon atoms, and, when substituted, $R^2$ is substituted with a halogen atom, alkyl, aryl, alkoxy, aryloxy, alkoxycarbonyl, acyloxy, acyl, alkylsulfanyl, arylsulfanyl, alkylamino, dialkylamino, arylamino, hydroxy, carboxy, formyl, mercapto, sulfo, mesyl, p-toluenesulfonyl, amino, nitro, cyano, trifluoromethyl, trichloromethyl, trimethylsilyl, phosphinico or phosphono group, and $Q2^+$ is a hydroxy-containing secondary or tertiary ammonium ion.

7. The method of claim 1, wherein $R^1$ is selected from the group consisting of a substituted or unsubstituted aryl group having 6 to 30 carbon atoms, or a substituted or unsubstituted arylalkyl group having 7 to 31 carbon atoms, and, when substituted, $R^1$ is substituted with a halogen atom, alkyl, aryl, alkoxy, aryloxy, alkoxycarbonyl, acyloxy, acyl, alkylsulfanyl, arylsulfanyl, alkylamino, dialkylamino, arylamino, hydroxy, carboxy, formyl, mercapto, sulfo, mesyl, p-toluenesulfonyl, amino, nitro, cyano, trifluoromethyl, trichloromethyl, trimethylsilyl, phosphinico or phosphono group.

8. The method of claim 1, wherein n is 1 to 50.

9. The ABS resin composition of claim 6, wherein $R^1$ is selected from the group consisting of a substituted or unsubstituted aryl group having 6 to 30 carbon atoms, or a substituted or unsubstituted arylalkyl group having 7 to 31 carbon atoms, and, when substituted, $R^1$ is substituted with a halogen atom, alkyl, aryl, alkoxy, aryloxy, alkoxycarbonyl, acyloxy, acyl, alkylsulfanyl, arylsulfanyl, alkylamino, dialkylamino, arylamino, hydroxy, carboxy, formyl, mercapto, sulfo, mesyl, p-toluenesulfonyl, amino, nitro, cyano, trifluoromethyl, trichloromethyl, trimethylsilyl, phosphinico or phosphono group.

10. The ABS resin composition of claim 6, wherein n is 1 to 50.

11. The ABS resin composition of claim 6, wherein said ionically bonded salt is the compound of formula (2).

* * * * *